United States Patent [19]

Watada et al.

[11] Patent Number: 5,323,366
[45] Date of Patent: Jun. 21, 1994

[54] MAGNETO-OPTICAL RECORDING METHOD WITH SWITCHING AND MAINTAINING PERPENDICULAR MAGNETIZATION LIGHT BEAM APPLICATION MODES

[75] Inventors: Atsuyuki Watada, Kawasaki; Toshiaki Tokita, Zama; Motoharu Tanaka, Kawasaki, all of Japan

[73] Assignee: Ricoh Company, Ltd., Tokyo, Japan

[21] Appl. No.: 24,845

[22] Filed: Feb. 26, 1993

Related U.S. Application Data

[63] Continuation of Ser. No. 668,489, Mar. 13, 1991, abandoned.

[30] Foreign Application Priority Data

Mar. 15, 1990 [JP] Japan .................................. 2-64959

[51] Int. Cl.$^5$ .............................................. G11B 7/00
[52] U.S. Cl. ...................................... 369/13; 369/110; 369/116
[58] Field of Search ................ 369/13, 47, 54, 58, 369/59, 100, 110, 111, 116; 360/59, 114

[56] References Cited

U.S. PATENT DOCUMENTS

| | | | |
|---|---|---|---|
| 4,882,718 | 11/1989 | Kryder et al. | 369/13 |
| 5,020,040 | 5/1991 | Lee | 369/47 |

*Primary Examiner*—W. R. Young
*Attorney, Agent, or Firm*—Cooper & Dunham

[57] ABSTRACT

A magneto-optical recording method is disclosed, by which a magnetic recording pattern is formed in an overwriting mode, utilizing demagnetizing field, by directing a light beam onto a perpendicularly magnetized film layer of a magneto-optical recording medium, wherein when recording is being carried out by the application of a light beam onto the perpendicularly magnetized film layer, on switching the direction of magnetization for recording from downward to upward or from upward to downward, when required, with respect to the surface of the magnetized film layer, a light beam application mode for a light-beam applied portion in the magnetized film layer to which the light beam has been applied, and a light beam application mode in a portion in the magnetized film layer immediately after the light-beam applied portion to which the light beam is yet to be applied, are changed.

5 Claims, 3 Drawing Sheets

MAGNETO-OPTICAL RECORDING METHOD WITH SWITCHING AND MAINTAINING PERPENDICULAR MAGNETIZATION LIGHT BEAM APPLICATION MODES

This is a continuation of application Ser. No. 68,489, filed Mar. 13, 1991, now abandoned.

BACKGROUND OF THE INVENTION

1. Field of the Invention

The present invention relates to a magneto-optical recording method, and more particularly to a magneto-optical recording method capable of performing overwriting.

2. Discussion of Background

In recent years, the development of magneto-optical recording has proceeded actively because this method is capable of recording higher volumes of information than conventional magnetic recording and the like, and because rewriting of the information is possible. Some of these developments are already on the market. However, with many of the magneto-optical recording apparatus now on the market, when information is written, it is necessary to first erase the original information, then write in the new information. Considerable time is wasted in making this erasure.

Although many different magneto-optical recording methods in which overwriting is possible have been proposed, they have not been used in practice because of a number of problems.

The following magneto-optical recording methods are conventionally known:
(1) A general light modulation system (for example, described in Applied Magnetics Association Journal Vol. 8. No. 5 (1984)).
(2) An overwrite system by varying light intensity using a two-layered film (for example, described in Applied Magnetics Research Association Data 55-15 (1988)).
(3) A magnetic field modulation system utilizing a fixed magnet (for example, described in Electrical Society Magnetics Research Association Data MAG-86-96)).
(4) A magnetic field modulation system utilizing a floating head (for example, described in Electrical Society Magnetics Research Association Data MAG-87-178(1987), Japanese Laid-Open Patent Application 63-204532 and Japanese Laid-Open Patent Application 63-217548)).
(5) An overwrite system utilizing a magnetic head with a resonance circuit and a pulsed laser (for example, described in IEEE Trans. Magn. 24, P.666 (1988) and Japanese Laid-Open Patent Application 63-37842).
(6) A system utilizing demagnetizing field (Han-Ping D. Shieh and Mark H. Kryder, Appl. Phys. Lett. 49(1985) 473; Han-Ping D. Shieh and Mark H. Kryder, IEEE Trans. Magn., Vol. MAG-23(1987)171; M. D. Schultz, H-P.D. Shieth and M. H. Kryder, J. Appl. Phys. 63 (1988)3844).

An analysis of the systems listed above shows that: with the light modulation system (1), it is generally impossible to overwrite unless an erasure operation is first performed, with the attendant problem that considerable time is required for rewriting.

With the overwrite system (2) by varying light intensity, using a two-layered film, the recording layer becomes complex in structure, so that the fine adjustment of the exchange bonding between the two layers is very difficult, and a large magnetic field is necessary for initialization. The problem therefore arises that a large expensive magnet must be used for initialization so that the size of the apparatus increases. Furthermore, the difference in power between the light beams with "1" and "0" during recording is so small that the respective allowable differences are restricted, so that the recording becomes unstable.

With the magnetic field modulation system (3), utilizing a fixed magnet, a large magnet is required and the amount of power consumed is therefore large. It is also extremely difficult to conduct high speed recording, and it is generally agreed that this system is restricted to digital recording at about 1 MHz.

With the magnetic field modulation system (4), utilizing a floating head, the magnetic head almost touches the optical recording disk medium so that the advantage of avoiding contact with the optical disk medium is essentially lost. Furthermore, there is the necessity for forming the medium in the form of a single plate, which causes problems with the volume of memory and in protection of the substrate and the magnetic layer formed thereon.

The overwrite system (5) utilizing a magnetic head with a resonance circuit and a pulsed laser is better than the above-mentioned magnetic field modulation system (3), but exhibits the same type of problems.

With the system (6) utilizing demagnetizing field, the laser pulse must be precisely directed at the position of the previously recorded bit, therefore control of positioning of the laser pulse is difficult. Another problem is the fact that recording can take place only at these bit positions.

SUMMARY OF THE INVENTION

Accordingly, an object of the present invention is to provide, with due consideration to the drawbacks of such conventional systems, a magneto-optical recording method which solves the problems associated with the system (6) utilizing a demagnetizing field, and is capable of performing highly reliable, high speed direct-overwrite magneto-optical recording, without the necessity for a recording medium with a complicated structure and a complicated recording apparatus.

This object of the present invention is achieved by a magneto-optical recording method as disclosed, by which a magnetic recording pattern is formed in an overwriting mode, utilizing demagnetizing field, by directing a light beam onto a perpendicularly magnetized film layer of a magneto-optical recording medium, wherein when recording is being carried out by the application of a light beam onto the perpendicularly magnetized film layer, on switching the direction of magnetization for recording from downward to upward or from upward to downward, when required, with respect to the surface of the magnetized film layer, a light beam application mode for a light-beam applied portion in the magnetized film layer to which the light beam has been applied and a light beam application mode in a portion in the magnetized film layer immediately after the light-beam applied portion to which the light beam is yet to be applied, are changed. The light beam application mode can be changed, for example, by changing the spot diameter of the light beam, the pulse width of the light beam, or the light power of the light beam, or by changing the light beam from a single pulse light beam to a continuous pulse light beam or vice versa.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings, wherein.

DETAILED DESCRIPTION OF THE PREFERRED EMBODIMENT

Figure 1:
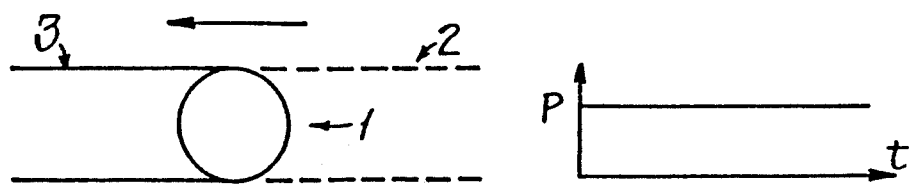
FIG. 1 is a diagram in explanation of a light spot and recording area when a DC light beam is directed to a recording medium.
Figure 2:
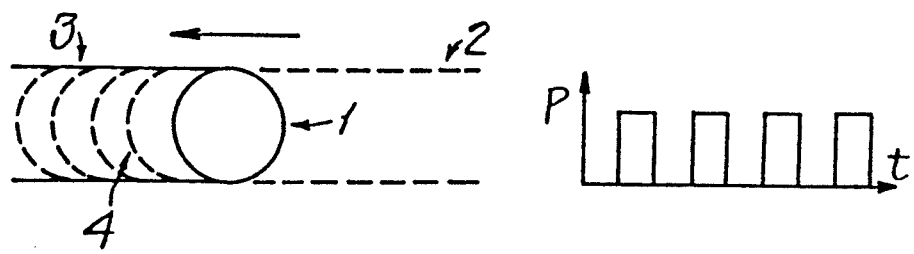
FIG. 2 is a diagram in explanation of a light spot and recording area when a continuous pulse light beam is directed to the recording medium.

Referring now to FIG. 1 and FIG. 2, a light spot 1 and a recording area 3 are shown in the case where a DC beam or a continuous pulse beam is directed onto a moving recording medium which is moved in the direction of the arrow. Reference numeral 4 in FIG. 2 indicates a position where the light spot 1 had previously been directed. In the case where recording is carried out as shown in FIG. 1 or FIG. 2, the direction of the remaining magnetization in the recording area 3 causes a problem with the condition of the area immediately after being illuminated by the light spot 1, specifically, with the condition of the area 5 shown in FIG. 3.

Figure 3:
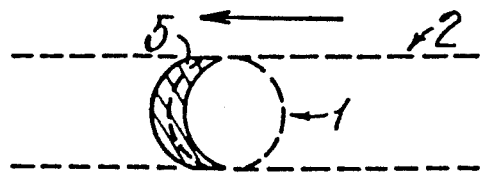
FIG. 3 is a diagram in explanation of an area wherein the direction of magnetization is determined immediately after a light beam is directed onto the recording medium.

For example, in the case of illumination with the DC light beam shown in FIG. 1, the area 5 shown in FIG. 3 is subjected to a cooling process so that the freezing of the magnetization and reversing of the magnetization will occur in that area. In the case of illumination with the continuous pulse light beam shown in FIG. 2, almost the total area illuminated by the light spot 1 is subjected to a cooling process so that the freezing of the magnetization and reversing of the magnetization will occur in that area. This is because recording can be done once again in the area where subsequent pulse light beams are applied in an overlapping manner.

Whether the direction of magnetization in an area 5 in FIG. 3 is upward or downward is determined in a complex manner by the factors such as the demagnetizing field, coercive force, and magnetic wall energy of the magneto-optical recording medium, and external magnetic field.

Figure 4:
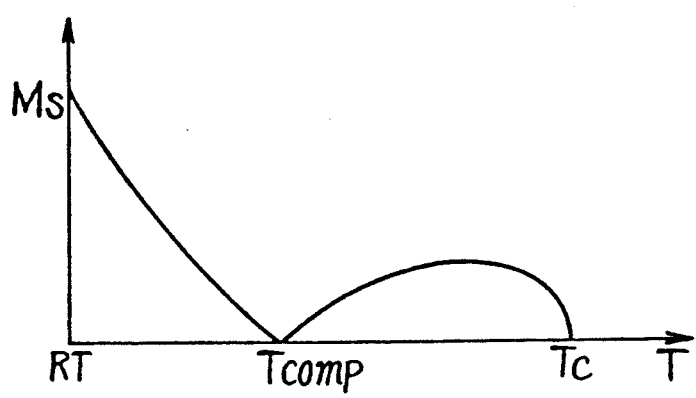
FIG. 4 is a diagram showing the temperature characteristics of the saturation magnetization of a general rare earth—transition metal amorphous alloy film layer.
Figure 5:
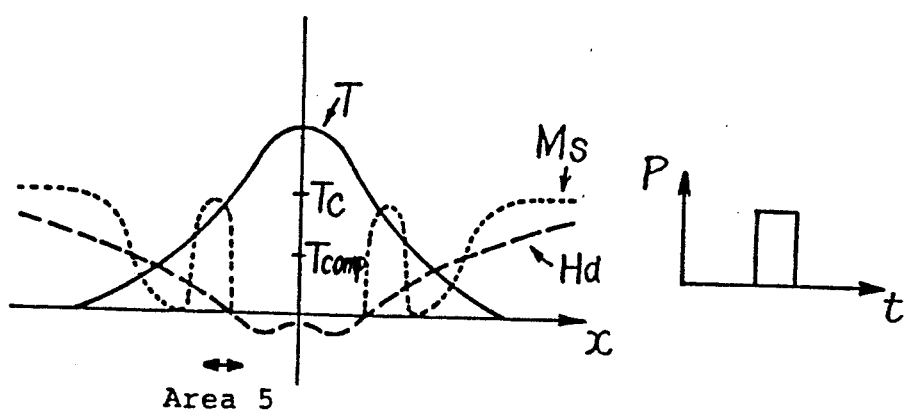
FIG. 5 is a diagram showing the properties of the recording medium immediately after the application of a light beam pulse.

FIG. 4 shows the representative temperature characteristics of saturation magnetization of a rare earth —transition metal amorphous alloy film layer. FIG. 5 shows an example of the temperature (T), the saturation magnetization (Ms), and demagnetizing field (Hd) of a magneto-optical recording medium prepared by use of the above rare earth—transition metal amorphous alloy immediately after the light pulse is applied thereto.

The demagnetizing field (Hd) varies greatly according to the temperature distribution in the recording medium, the Ms-T characteristics as shown in FIG. 4, the thickness of a magnetic film of the recording medium, and other factors. Furthermore, the temperature distribution in the recording medium varies according to the spot diameter, pulse width, and light power of the light pulse beam, and other factors, of the light pulse directed to the recording medium.

Therefore, the direction and magnitude of the demagnetizing field applied to the area 5 shown in FIG. 3, and the direction of magnetization for recording can be controlled by suitable selection of these values.

In addition, in the case where the thickness of the magnetic film layer is sufficiently small in comparison with the diameter of the light spot, the demagnetizing field applied to the area 5 and a force which sets the direction of the magnetization by a magnetic bonding force are greatly affected by the area immediately to the right of the area 5 in FIG. 3 and FIG. 5 and are controlled by the direction of magnetization of that area.

For the above reasons, the direction of magnetization of the area 5 can be freely set the same as or opposite to the direction of magnetization of the area immediately to the right according to the method of directing the light onto the recording medium.

In actual practice, in the case where a signal is recorded on the recording medium by reversing the direction of magnetization from "0" to "1" or from "1" to "0", the light beam is directed by a method which sets the direction of magnetization opposite to that in the area to which the light beam has been applied and which area is positioned immediately beside a portion to which the light beam is yet to be applied. In the case where a signal is recorded on the recording medium without reversing the direction of magnetization, the light beam is directed by a method which sets the direction of magnetization in the same direction as the light-beam-applied area. In addition, the initial "1" or "0" can be set by adopting the direction of magnetization of the area in which no information is recorded in the first sector or the like, or by applying a momentary weak external magnetic field, if a light spot is in that area.

Figure 6:
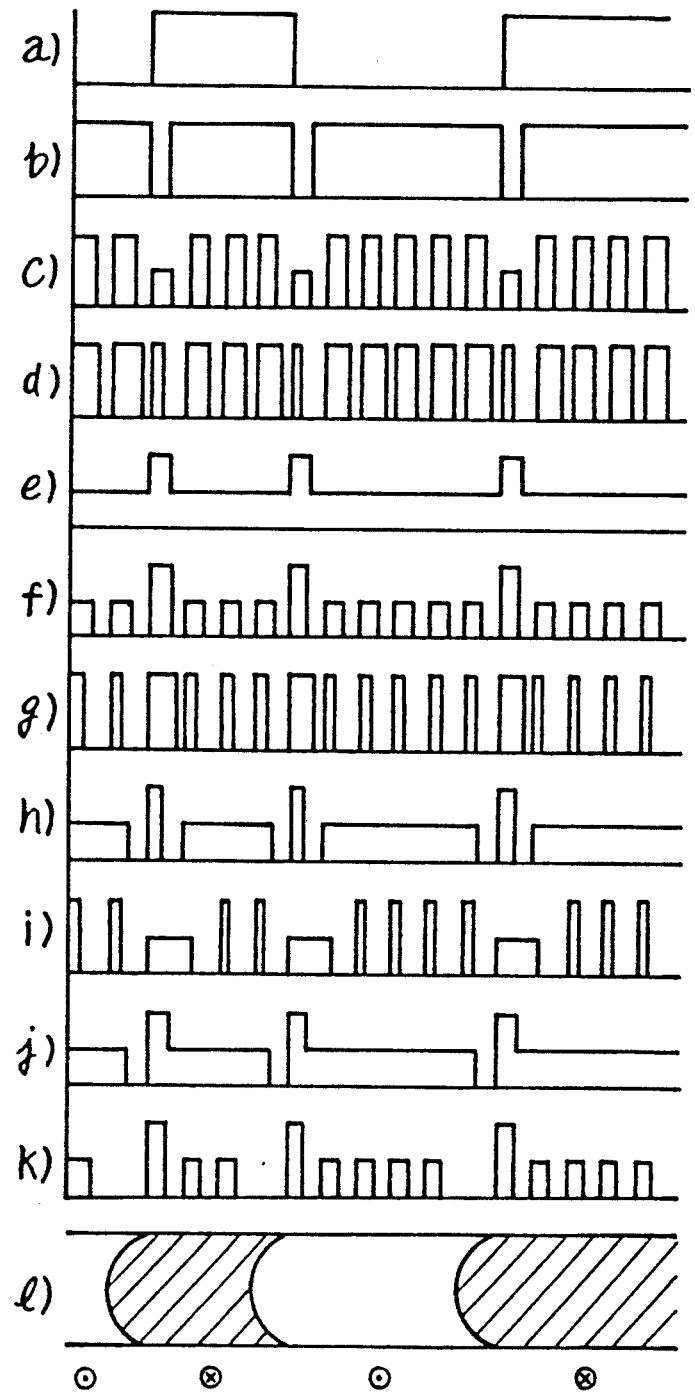
FIG. 6 is a diagram showing an example of the magneto-optical recording method according to the present invention, in particular, a method of light beam application during recording.

With reference to FIG. 6, examples of a light beam application method for implementing the present invention will now be explained. In FIG. 6, the abscissa of (a) to (k) represents elapsed time. (a) is an example of an information recording signal, (b) to (k) are examples of examples of a beam application method, and (1) shows the respective reversed magnetization patterns recorded on the recording medium.

As shown in FIG. 6, the light beam can be effectively applied either by DC or in pulse form. In addition, the same type of effect is obtained by a method which combines a single pulse and a continuous pulse, and also by a method in which pulse width and light power are varied. Appropriate light beam application conditions can change greatly depending upon the characteristics of the magnetic film layer and the relationship between the thickness of the magnetic film layer and the diameter of the light spot. However, the thinner the magnetic film layer, the less the conditions are affected by the direction of magnetization outside the track. In addition, an external magnetic field may be applied when recording to a degree which negates the demagnetizing magnetic field from between adjacent tracks, or the application of an external magnetic field may be omitted.

In the present invention, any method of applying the light beam may be used if it is accompanied by a change in the temperature distribution in the recording medium, and is not restricted to the methods indicated in (b) to (k) of FIG. 6.

As explained in the foregoing, according to the present invention, it is comparatively easy to control the direction of magnetization of the recording medium and reverse that direction. Therefore, the direction of magnetization of the recording medium can be freely controlled, and direct overwriting is possible.

In addition, according to the present invention, the recording medium can be easily fabricated because it is not necessary to have a complex configuration with two film layers and the like, such as required in the previously explained, conventional overwrite method (2) by which the light intensity is varied using a two-layered film.

Furthermore, according to the present invention, the structure of a recording apparatus for use in the present invention is simple because a high frequency magnetic field is unnecessary. Recording at high frequencies is also easily accomplished according to the present invention.

Also, because it is not necessary to position a magnetic head close to the magnetic film layer of the recording medium, the magnetic film layer can be covered with a thick protective layer or a protective plate, and it is possible to provide overwriting with high reliability. In addition, there is an increase in the amount of information recorded because it is possible to use both sides of a recorded disk simultaneously. Pit edge recording is also possible by the present invention.

What is claimed is:

1. A magneto-optical recording method of forming a magnetic recording pattern in an overwriting mode, utilizing demagnetizing field, by directing a light beam onto a perpendicularly magnetized film layer of a magneto-optical recording medium, said method comprising:

(a) applying a light beam onto said perpendicularly magnetized film layer for recording, while (b) switching the direction of magnetization for recording from downward to upward or from upward to downward, when required, with respect to the surface of said magnetized film layer, wherein the improvement comprises:

(c) the applying step comprising applying said light beam to a portion in said magnetized film layer thereby to establish a light-beam applied portion in said film layer, applying said light beam to a portion in said magnetized film layer immediately after said light-beam applied portion whereby the second-mentioned portion itself becomes a light-beam applied portion, and continuing to apply the light beam to further portions in said magnetized film layer immediately after the second-mentioned portion and immediately after each other such that each of said further portions in turn becomes a light-beam applied portion, said light beam being applied to each of said portions either in a light-beam application mode for switching the direction of perpendicular magnetization between a light-beam applied portion and a portion immediately thereafter or in a light-beam application mode for maintaining the same direction of perpendicular magnetization, as that in a light-beam applied portion, in a portion immediately thereafter;

(d) in switching the direction of perpendicular magnetization as aforesaid when recording is being carried out by the application of a light beam onto said film layer, using one of said light beam application modes for a light-beam applied portion in said magnetized film layer to which said light beam has been applied, and using said switching light beam application mode in a portion in said magnetized film layer immediately after said light-beam applied portion to which said light beam is yet to be applied, the light beam being applied to both of said portions, while changing the application mode between the two last-mentioned portions when the mode used for the light-beam applied portion is said mode for maintaining the same direction of perpendicular magnetization; and (e) in maintaining the same direction of perpendicular magnetization as aforesaid when recording is being carried out by the application of a light beam onto said film layer, using one of said light beam application modes for a light-beam applied portion in said magnetized film layer to which said light beam has been applied, and using said light beam application mode for maintaining the same direction of perpendicular magnetization in a portion in said magnetized film layer immediately after said light-beam applied portion to which said light beam is yet to be applied, the light beam being applied to both of said portions, while changing the application mode between the two last-mentioned portions when the mode used for the light-beam applied portion is said switching light beam application mode.

2. The magneto-optical recording method as claimed in claim 1, wherein said light beam application mode is changed by changing the light spot diameter of said light beam.

3. The magneto-optical recording method as claimed in claim 1, wherein said light beam application mode is changed by changing the pulse width of said light beam.

4. The magneto-optical recording method as claimed in claim 1, wherein said light beam application mode is changed by changing the light power of said light beam.

5. The magneto-optical recording method as claimed in claim 1, wherein said light beam application mode is changed by changing said light beam from a single pulse light beam to a continuous pulse beam or vice versa.

* * * * *